United States Patent
Grassl et al.

(10) Patent No.: US 11,437,866 B2
(45) Date of Patent: Sep. 6, 2022

(54) CONTACTLESS MOTOR VEHICLE-CHARGING DEVICE, COMPONENT OF A CONTACTLESS MOTOR VEHICLE-CHARGING DEVICE, METHOD FOR CONTROLLING A CONTACTLESS MOTOR VEHICLE-CHARGING DEVICE AND A MOTOR VEHICLE HAVING A CONTACTLESS MOTOR VEHICLE-CHARGING DEVICE

(71) Applicant: AUDI AG, Ingolstadt (DE)

(72) Inventors: Tobias Grassl, Denkendorf (DE); Reinhard Peer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 339 days.

(21) Appl. No.: 16/613,292

(22) PCT Filed: Apr. 16, 2018

(86) PCT No.: PCT/EP2018/059650
§ 371 (c)(1),
(2) Date: Nov. 13, 2019

(87) PCT Pub. No.: WO2018/215137
PCT Pub. Date: Nov. 29, 2018

(65) Prior Publication Data
US 2021/0284032 A1    Sep. 16, 2021

(30) Foreign Application Priority Data
May 22, 2017    (DE) .......................... 102017208595.9

(51) Int. Cl.
*H02J 50/80*    (2016.01)
*H02J 50/05*    (2016.01)
(Continued)

(52) U.S. Cl.
CPC .............. *H02J 50/80* (2016.02); *B60L 53/12* (2019.02); *B60L 53/126* (2019.02); *B60L 53/62* (2019.02);
(Continued)

(58) Field of Classification Search
CPC ....................................................... H02J 50/80
(Continued)

(56) References Cited

U.S. PATENT DOCUMENTS

2009/0112291 A1* 4/2009 Wahlstrand .......... A61N 1/3787
607/61
2015/0130272 A1    5/2015 Suzuki et al.
2016/0368387 A1* 12/2016 Pavlovsky .......... H02J 7/00034

FOREIGN PATENT DOCUMENTS

DE         10056611 A1    5/2002
DE    202010016586 U1    5/2012
(Continued)

OTHER PUBLICATIONS

International Preliminary Report on Patentability (Chapter II) dated Nov. 28, 2019, in corresponding International Application No. PCT/EP2018/059650; 6 pages.
(Continued)

*Primary Examiner* — Eric D Lee
(74) *Attorney, Agent, or Firm* — Maier & Maier, PLLC

(57) ABSTRACT

A contactless motor vehicle-charging device which, as components, includes a primary side and a secondary side, between which, via at least one air gap, energy can be transferred via inductive and/or capacitive coupling, and each of the components in each case includes at least a portion of a control circuit of the contactless motor vehicle-charging device, wherein at least one of the components includes a field controller and at least one of the components comprises a field measurement device which is designed to
(Continued)

acquire a magnetic and/or electric field strength, wherein the field controller is designed to use in at least one control operation the acquired field strength as an actual value and, by this actual value and a predetermined setpoint value, to set at least one field strength of the contactless motor vehicle-charging device as a control variable.

11 Claims, 2 Drawing Sheets

(51) Int. Cl.
    *B60L 53/126*     (2019.01)
    *H02J 50/10*     (2016.01)
    *B60L 53/12*     (2019.01)
    *B60L 53/62*     (2019.01)
    *B60L 53/66*     (2019.01)

(52) U.S. Cl.
    CPC .............. *B60L 53/66* (2019.02); *H02J 50/05* (2016.02); *H02J 50/10* (2016.02); *H02J 2310/48* (2020.01)

(58) Field of Classification Search
    USPC ........................................................ 320/108
    See application file for complete search history.

(56) References Cited

FOREIGN PATENT DOCUMENTS

| | | |
|---|---|---|
| DE | 102010054472 A1 | 6/2012 |
| DE | 102013207883 A1 | 10/2014 |
| DE | 102013215785 A1 | 2/2015 |
| DE | 102013224586 A1 | 6/2015 |
| DE | 102013227129 A1 | 6/2015 |
| DE | 102014220265 A1 | 4/2016 |

OTHER PUBLICATIONS

German Examination Report dated Apr. 23, 2018 in corresponding German Application No. 102017208595.9; 20 pages.
International Search Report and Written Opinion dated Jun. 29, 2018 in corresponding International Application No. PCT/EP2018/059650; 21 pages.
International Preliminary Report on Patentability dated Aug. 5, 2019 in corresponding International Application No. PCT/EP2018/059650; 28 pages.

* cited by examiner

CONTACTLESS MOTOR VEHICLE-CHARGING DEVICE, COMPONENT OF A CONTACTLESS MOTOR VEHICLE-CHARGING DEVICE, METHOD FOR CONTROLLING A CONTACTLESS MOTOR VEHICLE-CHARGING DEVICE AND A MOTOR VEHICLE HAVING A CONTACTLESS MOTOR VEHICLE-CHARGING DEVICE

FIELD

The invention relates to a contactless motor vehicle-charging device with at least one primary side and at least one secondary side as components, to such a component of a contactless motor vehicle-charging device, to a method for controlling a contactless motor vehicle-charging device and to a motor vehicle having a contactless motor vehicle-charging device.

BACKGROUND

The contactless motor vehicle-charging device comprises a control circuit which is designed to control variables of the contactless motor vehicle-charging device in order to enable a controlled energy transfer at least from a primary side to a secondary side and in order to possibly correct any interfering influences occurring in the process. The contactless motor vehicle-charging device is provided for use in motor vehicles as well as buses, trucks or similar electric or hybrid vehicles with at least one electrical energy storage such as a battery.

In DE 10 2013 224 586 A1, a method and a control circuit for the frequency generation for a resonant converter are proposed. A power, current or voltage control of the resonant converter occurs via a frequency of a resonant circuit. The resonant converter comprises a controller on a primary side of a battery charging system and a controller on a secondary side.

From DE 10 2013 207 883 A1, a circuit arrangement with a resonant converter and a method for operating a resonant converter are known. A battery charging system consists of a primary side and a secondary side. The primary side and the secondary side in each case comprise a controller and in each case a current sensor and a voltage sensor. A communication between primary side and secondary side occurs wirelessly, for example, via WLAN.

From DE 20 2010 016 586 U1, a device for the inductive transfer of electrical energy is known. A vehicle with a secondary inductance comprises a secondary controller for setting a secondary power drawn from the secondary inductance. A primary controller contains a first measurement device for setting a primary power which can be fed into a primary inductance, by means of which an electrical operating parameter of a power supply device, which is influenced by the secondary power, can be measured, and the primary controller sets a primary power, which can be fed in, as a function of changes of the measured operating parameter.

SUMMARY

The aim of the invention is to provide a contactless motor vehicle-charging device with high robustness of the control, which also provides a controlled operation with high degree of efficiency for different secondary sides designed independently of the primary side, and to provide a corresponding method.

The invention relates to a contactless motor vehicle-charging device with at least one primary side and at least one secondary side. The primary side and/or the secondary side here represent(s) in each case a component of the contactless motor vehicle-charging device. Thus, below, a component of the contactless motor vehicle-charging device is always intended to mean a primary side or a secondary side. In at least one operating mode, between a primary side and a secondary side, via an air gap, energy can be transferred by inductive or capacitive coupling. This means that, for example, the primary side of the contactless motor vehicle-charging device is formed as stationary component which has a power connection from which it can receive energy. This energy can be transferred via the inductive or capacitive coupling to the secondary side, so that, for example, an energy storage of the motor vehicle can be charged. An energy transfer from the secondary side to the primary side using known means is also possible, for example, when an energy storage of the motor vehicle is to be used as a power storage. Each component of the contactless motor vehicle-charging device comprises at least a portion of a control circuit. This means that each primary side and each secondary side comprises at least a portion of a control circuit which controls the energy transfer of the contactless motor vehicle-charging device. Here, a control circuit can be formed from a primary side onto a secondary side or in each case it can be formed entirely on only one component.

The invention provides that at least one component of the contactless motor vehicle-charging device comprises at least one field controller. The invention moreover provides that at least one of the components of the contactless motor vehicle-charging device comprises a field measurement device, wherein the field measurement device is a device for measuring a magnetic field or an electric field. This means that a field controller is provided, for example, only on the primary side or only on the secondary side, or it is provided both on at least one primary side and at least one secondary side. The same applies to the field measurement device. The at least one field measurement device is designed to acquire in each case a magnetic and/or electric field strength. The acquired field strength is a field strength of the contactless motor vehicle-charging device, in particular a field strength on the primary side and/or a field strength on the secondary side, which is present on a respective inductance or coil of a component. It is thus the field strength of a field which represents the inductive or capacitive coupling between a primary side and a secondary side, via which energy can be transferred. In at least one control operation, the acquired field strength represents an actual value of a control variable of a control circuit of the contactless motor vehicle-charging device, wherein the control variable according to the invention is the field strength of the field of the inductive or capacitive coupling. In other words, according to the invention, it is provided that the field via which the energy transfer of the contactless motor vehicle-charging device occurs itself represents at least one control variable of the control circuit of the contactless motor vehicle-charging device. The goal of the control is to adjust the actual value of the field strength to a predetermined value, which is a setpoint value. As another control variable, additionally an electrical voltage and/or an electrical current can also be provided. In this case, the contactless motor vehicle-charging device also comprises an additional voltage controller and/or an additional current controller.

The field controller which at least one of the components comprises is designed to use the actual value for the control. For this purpose, the contactless motor vehicle-charging device comprises at least one transfer device, via which information of the field measurement device can be transferred to the field controller. The transfer device can be a signal line between the field measurement device and the field controller or a radio-based transfer device which, for example, which is provided as WLAN connection or a Bluetooth connection. The field controller uses the actual value together with a predetermined setpoint value in order to set the control variable, that is to say the field strength of the energy-transferring field of the contactless motor vehicle-charging device. The field controller can operate in a manner known to the person skilled in the art in that it compares the actual value to the setpoint value, and, when the actual value deviates from the setpoint value, it adjusts the actual value to the setpoint value. The field controller is designed to control a field strength, for example, in that it changes a voltage or a current on a coil of the contactless motor vehicle-charging device, which generates the field. The field controller is thus designed to control a magnetic field and/or an electric field.

The resulting advantage is that the control circuit of the contactless motor vehicle-charging device comprises a field controller which is such that the control of the contactless motor vehicle-charging device exhibits high dynamics and high robustness. The field strength is the physical variable which reacts first to changes of the contactless motor vehicle-charging device during an energy transfer, since the field strength is the physical variable via which the energy is transferred. If, for example, due to a movement or a position change of the primary side and/or of the secondary side, the size of the air gap between said sides changes, the control circuit has to react to this change in order to continue to ensure a predetermined energy transfer. Since the control circuit uses the field strength as a control variable, the dynamics of the contactless motor vehicle-charging device are in particular higher than in a contactless motor vehicle-charging device which, for example, uses only a battery current and/or a battery voltage as control variable. In fact, in each case the battery current and/or the battery voltage in a component of the contactless motor vehicle-charging device is downstream of at least one coil and of a power electronics, for example, a rectifier, which results in a temporal delay which limits the control dynamics of the control circuit. The invention avoids this disadvantage in that it provides a field controller for the control circuit.

Because the contactless motor vehicle-charging device uses, as control variable, the field strength of the inductive or capacitive coupling between a primary side and a secondary side, the invention also enables interoperability between primary sides and secondary sides which are independently configured in terms of electrical design. This means that a secondary side, for example, does not have to be adjusted precisely to a primary side or to a control circuit of the primary side, for example, with regard to a circuit topology, in order to ensure a stable control of the energy transfer. When the field strength is used as control variable, the entire design of the opposite component does not have to be known, since only a control variable on the side of the respective component is controlled. Thus, a stable and robust control is also possible when different primary sides are coupled to different secondary sides for a contactless motor vehicle-charging device. The resulting advantage is that a topology of a component, in particular of the secondary side, does not have to be predetermined or limited, in order to achieve that the control remains stable or robust. As a result, the complexity of the control circuit is kept low, and further possibilities of development possibilities of the contactless motor vehicle-charging device are available without problem. Moreover, due to the high control dynamics resulting from the use of the field as control variable, a high degree of efficiency of the contactless motor vehicle-charging device is achieved, since, due to the short reaction time of the control, safety buffers can be designed to be minimal during the setting of the control variable. Thus, shorter charging times, for example, of a battery of the motor vehicle are made possible.

For example, on the primary side of the contactless motor vehicle-charging device, a field controller is provided, and, on the secondary side, a field measurement device is provided. The field measurement device of the secondary side can transmit the acquired field strength as actual variable to the field controller of the primary side, for example, via a radio transfer such as WLAN, whereupon said field controller sets a primary-side field strength so that the field strength acquired by the field measurement device on the secondary side has the value of the predetermined setpoint value which can be predetermined by a component of the contactless motor vehicle-charging device. In the process, advantageously and simply, it is possible to exploit the fact that a field strength on the secondary side is approximately of the same magnitude as a field strength on the primary side, so that the primary side field strength can be set to the value which represents the setpoint value of the secondary-side field strength. However, in developments of the invention, it is disclosed how different field strengths on the primary side and on the secondary side can be included in the control, so that the control is even more precise.

A development of the invention provides that the field measurement device is designed as a field strength sensor in order to acquire the field strength to be acquired by means of a measurement. This means that the field strength sensor on a respective component, that is to say, for example, on the secondary side, acquires the respective field strength and then outputs it as an actual value and/or transfers it to a field controller. A field strength sensor can be, for example, a Hall sensor, that is to say an electrical component which outputs an electrical voltage by means of the Hall effect, which is proportional to the acquired field strength. A field strength sensor can also be a so-called field plate, that is to say an electrical component which changes its resistance as a function of an acquired field strength. The English term for field plate is "magnetic dependent resistor," abbreviated MDR. The advantage of this embodiment is that the respective field strength can be acquired precisely in a simple manner by means of a measurement and can be output as a corresponding electrical signal and thus be available for controlling the contactless motor vehicle-charging device. A field strength sensor can be positioned, for example, so that it acquires in a coil of a component the field strength which is also present on a coil of a component, or it can be positioned so that it is located outside of a coil of a component, and the measurement result of the field strength sensor is scaled by means of a distance of the field strength sensor to the coil, so that the output measurement result, that is to say the respective actual value, corresponds to the field strength on the respective coil.

In a development of the invention, the field measurement device is designed to acquire the field strength by means of at least one electrical auxiliary variable and at least one auxiliary value. An electrical auxiliary variable can be, for example, a voltage induced on an inductance, that is to say on a coil, of a component of the contactless motor vehicle-charging device, or a current which flows through this inductance, for example, an excitation current. This development uses the fact that the respective electric auxiliary variable is in a direct proportion to the respective field strength. By conversion of the electrical auxiliary variable with the aid of an auxiliary value, the respective field strength is determined. In a simple embodiment, such an auxiliary value can be an inductance value of a respective coil or also a complex mathematical model which describes a respective coil more precisely, for example, based on the exact geometry of the coil or of the utilized materials of the coil and/or the coil cores present. This development has the advantage that an additional field measurement device in the form of a field strength sensor is not necessary, which makes the production of the contactless motor vehicle-charging device less complex and more cost effective.

DETAILED DESCRIPTION

In a development it is provided that a transmission device of the contactless motor vehicle-charging device is designed to transmit at least in each case an actual magnetic field strength of one of the components to a field controller of the primary side. This means that an instantaneous field strength of the primary side and/or secondary side is acquired by a respective field measurement device and transmitted to a field controller of the primary side. In particular, in the case in which the two components have a field measurement device, the resulting advantage is that the primary-side field controller can set a primary-side field strength precisely so that a predetermined setpoint value is present on the secondary side. The setpoint value can also be transferred by means of the transmission device from the secondary side to the primary side and it is predetermined, for example, by a battery monitoring system, which, for example, converts a necessary battery voltage into a necessary field strength, taking into consideration the electric design of the secondary side. In particular, for secondary sides that are independent of the control circuit of the primary side, the resulting advantage here is that the primary side can precisely adjust the energy transfer of the respective secondary side, without knowledge of a possible battery current and/or battery voltage of the secondary side. Thus, this results in a high interoperability between components of different contactless motor vehicle-charging systems.

A development of the contactless motor vehicle-charging device provides that each component comprises at least one field controller in each case and at least one field measurement device in each case. In at least operating mode, via a secondary-side transmission device, the secondary side requests the primary side to set a certain primary-side field strength. Via a change request, the secondary side thus communicates to the primary side that a higher or lower field strength on the secondary side is necessary or else that an instantaneous field strength is to be maintained.

In a development, the change request is a qualitative change request. This means that the secondary side requests from the primary side an increase or decrease of the primary-side field strength. The advantage of this is that a precise influence of the primary-side field strength on the secondary-side field strength does not have to be known. The secondary-side field strength reaches its setpoint value in that the primary-side field strength is successively changed by the primary-side field controller. Successive changing here is understood to mean a step-wise increase or decrease of the field strength. This can occur in a predetermined step range, wherein both a temporal step range between different values of the field strength and also a step range between two different amplitude values of the field strength can be predetermined. In particular, depending on the difference between a setpoint value and an actual value, the value of the field strength can be changed in different amplitude steps, so that, for example, in the case of a small difference, the primary-side field strength is changed in smaller amplitude steps than in the case of a larger difference between actual value and setpoint value, so that the result is a nonlinear control which is advantageous for different operating cases.

In a development, the change request is a quantitative change request according to a stored instruction which is provided for the contactless motor vehicle-charging device, in particular for the primary-side field controller. In the stored instruction, the influence of the air gap between primary side and secondary side on the field and in particular on the field strength on the primary side and on the field strength on the secondary side is described. This means that, for example, the influence of dispersion fields between primary side and secondary side is known and, in particular, it is known which value of a field strength is present on the secondary side in the case of a certain value of a field strength on the primary side. The advantage of this development is that the primary side can quickly and simply set a field strength so that precisely one requested setpoint value of the field strength is present on the secondary side. The stored instruction can here, for example, occur in a calibration step before each energy transfer, for example, in that the primary-side field controller sets a predetermined primary-side field strength, and in that a transfer device of the secondary side transmits a value of a secondary-side field strength, which results in this operation, to the primary-side field controller. Thus, this development as well can ensure interoperability between different primary side and different secondary side and at the same time provide a high control dynamics.

As already mentioned, the invention also covers a component of a contactless motor vehicle-charging device. Here, this involves in particular a component of a contactless motor vehicle-charging device according to the present invention. A component thus comprises at least one field controller and/or at least one field measurement device, as described in the above description.

As already mentioned, the invention also relates to a method for controlling a contactless motor vehicle-charging device. According to the method according to the invention, for controlling a contactless motor vehicle-charging device, a field strength is used as control variable. This field strength is the field strength of the field via which energy is transferred from a primary side to a secondary side or from a secondary side to a primary side by means of the contactless motor vehicle-charging device. Here, according to the method, here, at least one field strength is acquired by means of a field measurement device and used as an actual value for controlling the contactless motor vehicle-charging device. According to the invention, a field controller uses this actual value together with a setpoint value in order to set a field strength at least on a primary side of the contactless motor vehicle-charging device.

The invention also covers a motor vehicle having a contactless motor vehicle-charging device as described according to the invention. The motor vehicle here comprises at least one component of the described contactless motor vehicle-charging device and/or it comprises at least one field measurement device and/or at least one field controller.

The invention also covers developments of the components according to the invention, of the motor vehicle according to the invention, and of the method according to the invention, which comprise features as already described in connection with the developments of the contactless motor vehicle-charging device according to the invention. For this reason, the corresponding developments of the method according to the invention are not described again here.

BRIEF DESCRIPTION OF THE DRAWINGS

Below, embodiment examples of the invention are described. For this purpose.

Figure 1:
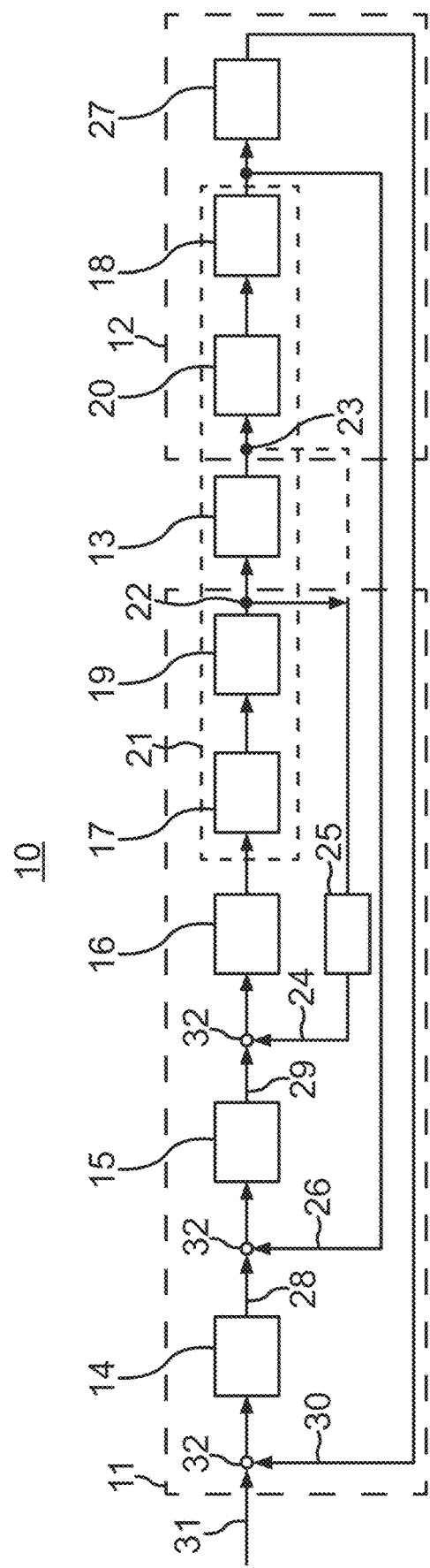
FIG. 1 shows a diagrammatic block circuit diagram of a contactless motor vehicle-charging device with a control circuit and a primary-side field controller.

The embodiment examples explained below are preferred embodiments of the invention. In the embodiment examples, the described components of the embodiments in each case represent individual features of the invention, which are to be considered independently of one another, which in each case also further develop the invention independently of one another and should thus be considered as component of the invention individually or in a combination other than the combination shown. Moreover, the described embodiments can also be completed by others of the already described features of the invention.

In the figures, functionally equivalent elements are in each case provided with the same reference numerals.

FIG. 1 shows a contactless motor vehicle-charging device 10 with a primary side 11 and a secondary side 12. Via an air gap 13, by means of a field, energy can be transferred between the two components of the contactless motor vehicle-charging device 10. The primary side 11 comprises a voltage controller 14, a current controller 15 and a field controller 16. In addition, the contactless motor vehicle-charging device 10 comprises a primary-side power electronics 17 and a secondary-side power electronics 18 as well as a primary-side coil system 19 and a secondary-side coil system 20. Via the control electronics 17, 18 and coil systems 19, 20 of the primary side 11 and of the secondary side 12, a control system 21 is formed. On the coil system 19, by means of a field measurement device, a field strength 22 can be acquired. On the coil system 20, by means of an additional field measurement device, a field strength 23 can be acquired. The field strength 22, 23 can be supplied as actual value 24 to the field controller 16. Here, the field strength 22, 23 can optionally be adjusted by means of an adjustment device 25. The current controller 15 can receive, transmitted from the secondary side 12, an actual value 26 of an electrical current of a battery 27. Together with a setpoint value 28 of an electrical current, the current controller 15 forms a setpoint value 29 of a field strength. The setpoint value 28 is formed by the voltage controller 14, with the aid of an actual value 30 of an electrical voltage of the battery 27 and of a predetermined setpoint value 31. The setpoint values 28, 29, 31 and the actual values 24, 26, 30 are compared each by means of subtractors 32.

Figure 2:
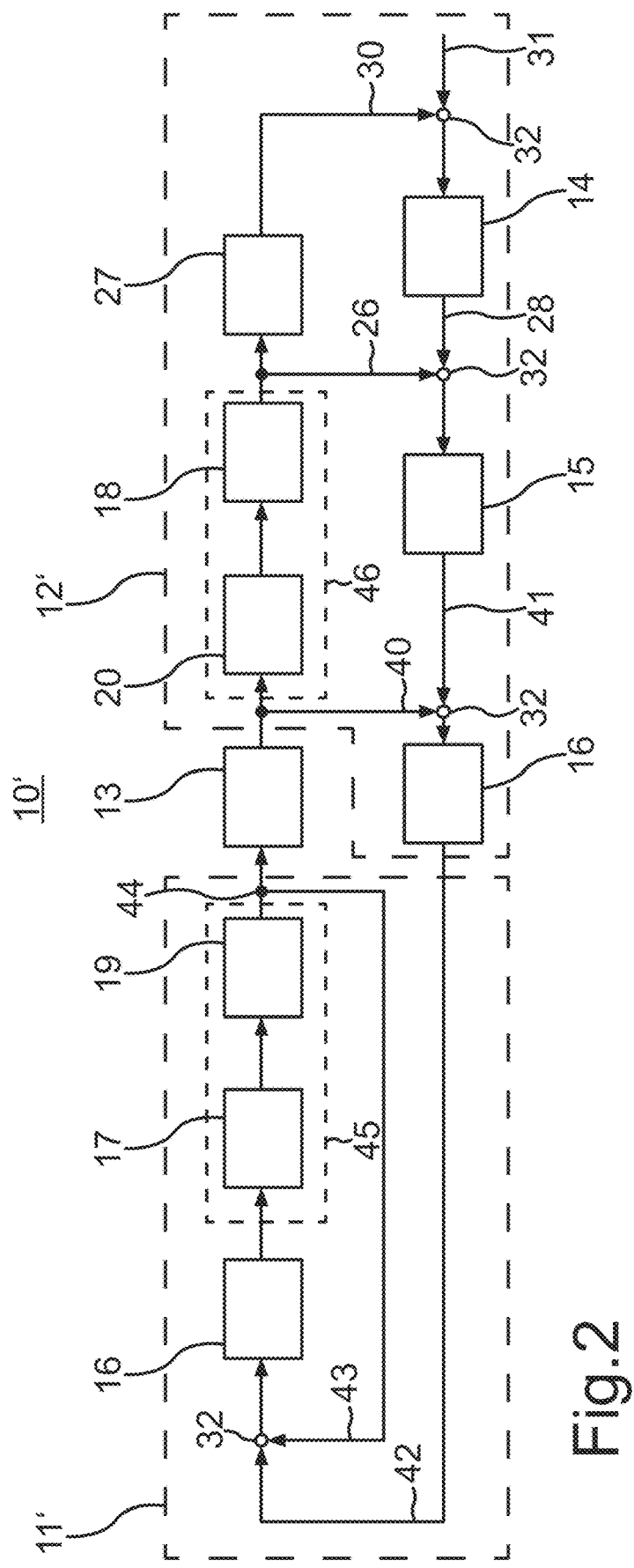
FIG. 2 shows a diagrammatic block circuit diagram of a contactless motor vehicle-charging device with a control circuit and a primary-side field controller and a secondary-side field controller.

FIG. 2 shows a contactless motor vehicle-charging device 10' with a primary side 11' and a secondary side 12', between which an air gap 13 is formed. The primary side 11' comprises a power electronics 17 and a coil system 19. The secondary side 12' comprises a coil system 20 and a power electronics 18. The secondary side 12' moreover comprises a battery 27, a voltage controller 14, a current controller 15 and a field controller 16. Actual values 26, 30, 40 and setpoint values 28, 31, 41 are compared by means of subtractors 32. The actual value 40 is the value of an instantaneous field strength on the coil system 20 of the secondary side 12'. The setpoint value 41 is the value of a field strength which is supposed to exist on the coil system 20. The field controller 16 of the secondary side 12' transmits a setpoint value 42 to the primary side 11'. The setpoint value 42 represents the value of a field strength which is supposed to exist on the coil system 19 of the primary side 11'. The setpoint value 42 is compared to an actual value 43 by means of a subtractor 32, and, based on the setpoint value 42 and the actual value 43, the field controller 16 of the primary side 11' controls an instantaneous current primary-side field strength 44. In the contactless motor vehicle-charging device 10', the primary side 11' and the secondary side 12' each comprise an independent control system 45, 46.

In an embodiment example, the field controller 16 of the primary side 11 controls the field strength 22 based on the field strength 23 and the actual value 24 formed therefrom. The actual value 24 can correspond to the field strength 23 or be adjusted by means of the adjustment device 25, for example, when a secondary-side field measurement device is in a position which does not correspond to the position of the secondary-side coil system 20. The adjustment device 25 is thus designed to ensure that the actual value 24 corresponds to a field strength which is actually present on the coil system 20. In an embodiment example, the field controller 16 increases the field strength 22 step-wise when the actual value 24 is lower than the setpoint value 29. This is the case, for example, when a width of the air gap 13 is increased, for example, because a passenger steps out of a motor vehicle, the battery 27 of which is just then being charged by means of the contactless motor vehicle-charging device 10. The value of the field strength 22 is adjusted in time steps which are preferably shorter than 1 second, in particular shorter than 1 ms, until the field strength 22 has reached a predetermined value. The amplitude of the field strength is changed, for example, in 1% steps when the actual value and setpoint value differ only by less than 10%, and it is changed in 3% steps when the actual value and setpoint value differ by more than 10%. Other amplitude steps are also possible.

In another embodiment example, the control systems 45, 46 of the primary side 11' and of the secondary side 12' are implemented separately. Based on the instantaneous voltage of the battery 27 which is given by the actual value 30 and based on the instantaneous current of the battery 27 which is given by the actual value 26, the current controller 15 of the secondary side 12' forms a setpoint value 41 of a field strength which is supposed to exist on the secondary-side coil system 20. The subtractor 32 compares this setpoint value 41 with an actual value 40 of the instantaneous field strength on the coil system 20, so that the field controller 16 of the secondary side 12' forms a change request from the actual value 40 and the setpoint value 41, which is transferred by means of a transfer device to the primary side 11'. The transfer device can be designed to be radio-based and is implemented as a WLAN connection in this embodiment example. In this embodiment example, the change request represents the setpoint value 42 which contains information on which field strength 44 is supposed to be present on the coil system 19 of the primary side 11'. The field controller 16 of the secondary side 12' forms the setpoint value 42 according to a stored instruction which contains the influence of the air gap 13 on a field strength on the coil system 20 given the field strength 44 on the coil system 19 of the primary side 11'. In this way, the field controller 16 of the primary side 11' can set the field strength 44 in a single change step to the predetermined value. This results in a very high control dynamics of the control of the contactless motor vehicle-charging device 10'.

The invention provides a contactless motor vehicle-charging device having a stable controller which can react rapidly to interfering influences without knowledge of the entire control system. Thereby, components of the contactless motor vehicle-charging device which are produced by different manufacturers are interoperable with one another. The invention exploits the fact that the coupling of the primary side and the secondary side occurs via a field. This field thus directly influences the variables to be controlled on the secondary side. Therefore, the invention completes a control circuit of the contactless motor vehicle-charging device by means of a field control, for example, a field controller. The control thus occurs based on the magnetic flux. Here, the magnetic flux on the primary side and also on the secondary side or on both sides can be used for the control. Due to the fact that the control circuit can be divided into primary side and secondary side, the interoperability of the system increases. For example, the secondary side only needs to predetermine for the primary side the value to which the field strength is to be adjusted. Thus, the primary side just has to adjust to the primary-side generated field or, in other words, set its value; the control system in the secondary side plays no role for the controller design of the primary side. For example, as actual variable or actual value, the field on the primary side can be used, and, if necessary, from this the secondary-side field can be calculated via an optional adjustment. By dividing the control system into primary side and secondary side, the controller design is thus considerably simpler. Each separate control circuit thus only needs to be designed for the respective known hardware, which increases the degrees of freedom in the design. Due to the fact that the field strength is used for the control, the system becomes more dynamic and more robust. Primarily, interfering influences such as sudden changes of the air gap can be controlled better than without a field control. Instead of controlling the field strength directly, it is also possible to adjust to the variables which directly or indirectly influence the field, such as, for example, the excitation current or the induced voltage on a coil of component. With the aid of models, the resulting field can then be determined.

Overall, the examples show how a contactless motor vehicle-charging device is provided by the invention, the control of which comprises a high dynamics and a high robustness, and the components of which are suitable for interoperability.

The invention claimed is:

1. A contactless motor vehicle-charging device which, as components, comprises:
    at least one primary side with a primary-side coil system and at least one secondary side with a secondary-side coil system, between which, in at least one operating mode, via at least one air gap, energy can be transferred via inductive and/or capacitive coupling,
    wherein the secondary side comprises a voltage controller, a current controller, and a field controller, wherein the voltage controller receives a setpoint value of a voltage of a battery as well as an actual value of a voltage of a battery and at its output provides a setpoint value of a current of the battery,
    wherein the current controller receives the setpoint value of the current of the battery as well as an actual value of the current of the battery, wherein the current controller at its output provides a predetermined setpoint value for a secondary-side field strength on the secondary-side coil system;
    wherein the field controller receives the setpoint value of the secondary-side field strength, and an actual value of the secondary side field strength, which is provided by a secondary-side field measurement device, is supplied on the secondary-side coil system, wherein the field controller is designed to form at its output a setpoint value for a primary-side field strength on the primary-side coil system, wherein the contactless motor vehicle-charging device moreover comprises a transmission device which is designed to transfer the setpoint value for the primary-side field strength and an operating mode change request from the field controller on the secondary side to the primary side,
    wherein the primary side comprises a field controller and a field measurement device which is designed to acquire a magnetic and/or electric field strength on the primary-side coil system, wherein the setpoint value transferred by the secondary side is supplied to the primary-side field controller, and the actual value of the field strength, which is acquired by the primary-side field measurement device, is supplied on the primary-side coil system, wherein the primary-side field controller is designed to use in at least one controlled operation the field strength, acquired by the primary-side field measurement device, on the primary-side coil system, as an actual value, and, by means of this actual value and the setpoint value, which is transferred by the secondary side, to set at least the field strength on the primary-side coil system of the contactless motor vehicle-charging device as a control variable.

2. The contactless motor vehicle-charging device according to claim 1,
    wherein, as primary-side and/or secondary-side field measurement device, a field strength sensor is designed to acquire the field strength to be acquired by a measurement.

3. The contactless motor vehicle-charging device according to claim 2,
    wherein the primary-side and/or secondary-side field measurement device is designed to acquire the field strength to be acquired by at least one electrical auxiliary variable and at least one auxiliary value.

4. The contactless motor vehicle-charging device according to claim 2,
    wherein each of its components in each case comprises at least one field controller and in each case at least one field measurement device, and at least one secondary-side transmission device is designed to transmit to the primary side in at least one operating mode a change request for the setting of the primary-side field strength.

5. The contactless motor vehicle-charging device according to claim 1,
    wherein the primary-side and/or secondary-side field measurement device is designed to acquire the field strength to be acquired by at least one electrical auxiliary variable and at least one auxiliary value.

6. The contactless motor vehicle-charging device according to claim 5,
wherein each of its components in each case comprises at least one field controller and in each case at least one field measurement device, and at least one secondary-side transmission device is designed to transmit to the primary side in at least one operating mode a change request for the setting of the primary-side field strength.

7. The contactless motor vehicle-charging device according to claim 1,
wherein the operating mode change request is a qualitative change request, the content of which is either a request to increase or to decrease the primary-side field strength, and the primary-side field controller is designed to successively either increase or decrease the primary side field strength in accordance with the change request.

8. The contactless motor vehicle-charging device according to claim 7,
wherein the change request is a quantitative change request according to an instruction stored in a memory of the motor vehicle-charging device, which represents a setpoint value of the primary-side field strength.

9. The contactless motor vehicle-charging device according to claim 1,
wherein the change request is a quantitative change request according to an instruction stored in a memory of the motor vehicle-charging device, which represents a setpoint value of the primary-side field strength.

10. A primary side of a contactless motor vehicle-charging device with a primary side coil system, wherein the primary side comprises a field controller and a field measurement device which is designed to acquire a magnetic and/or electric field strength on the primary-side coil system,
wherein a predetermined setpoint value, transferred by a secondary side of the contactless motor vehicle-charging device, is supplied to the primary-side field controller, and the actual value of the field strength, which is acquired by the primary-side field measurement device, is supplied on the primary-side coil system, wherein the primary-side field controller is designed, to use, during at least one regulated operation, the field strength, which is acquired by the primary-side field measurement device, on the primary-side coil system as an actual value, and, by this actual value and the setpoint value, which is transferred by the secondary side, along with an operating mode change request, to set at least the field strength on the primary-side coil system of the contactless motor vehicle-charging device as a control variable.

11. A secondary side of a contactless motor vehicle-charging device with a secondary side coil system,
wherein the secondary side comprises a voltage controller, to which a setpoint value of a voltage of a battery as well as an actual value of a voltage of a battery are supplied, wherein the voltage controller at its output provides a setpoint value of a current of the battery,
wherein the secondary side moreover comprises a current controller, to which the setpoint value of the current of a battery as well as an actual value of the current of a battery is supplied, wherein the current controller at its output provides a predetermined setpoint value for a secondary-side field strength on the secondary-side coil system;
wherein the secondary side moreover comprises a field controller, to which the setpoint value of the secondary-side field strength is supplied on the secondary-side coil system, and an actual value of the secondary side field strength, which is provided by a secondary-side field measurement device, is supplied on the secondary-side coil system, wherein the field controller is designed to form at its output a setpoint value for a primary-side field strength on a primary-side coil system, wherein the secondary side moreover comprises a transmission device which is designed to transfer this setpoint value for the primary-side field strength and an operating mode change request to the primary side of the contactless motor vehicle-charging device.

* * * * *